(12) United States Patent
Stephenne et al.

(10) Patent No.: US 7,868,106 B2
(45) Date of Patent: Jan. 11, 2011

(54) CAPS AND CLOSURES

(75) Inventors: Vincent Stephenne, Sart-Dames-Avelines (BE); Eric Maziers, Seneffe (BE); Olivier Miserque, Mont-Saint-Guibert (BE); Martine Slawinski, Nivelles (BE)

(73) Assignee: Total Petrochemicals Research, Feluy (BE)

( * ) Notice: Subject to any disclaimer, the term of this patent is extended or adjusted under 35 U.S.C. 154(b) by 473 days.

(21) Appl. No.: 11/793,453

(22) PCT Filed: Dec. 21, 2005

(86) PCT No.: PCT/EP2005/057021

§ 371 (c)(1),
(2), (4) Date: May 30, 2008

(87) PCT Pub. No.: WO2006/067179

PCT Pub. Date: Jun. 29, 2006

(65) Prior Publication Data

US 2008/0257854 A1    Oct. 23, 2008

(30) Foreign Application Priority Data

Dec. 22, 2004   (EP) .................. 04106829

(51) Int. Cl.
*C08F 4/42*   (2006.01)
(52) U.S. Cl. ............. 526/160; 526/352; 526/351; 526/943; 502/103; 502/152
(58) Field of Classification Search ......... 526/351, 526/352, 160, 165, 943; 502/103, 153, 154, 502/152
See application file for complete search history.

(56) References Cited

U.S. PATENT DOCUMENTS 6,541,584 B1 *  4/2003  Resconi ............... 526/160

FOREIGN PATENT DOCUMENTS

| WO | WO 00/71615 | * 11/2000 |
| WO | WO 2005/014680 | 2/2005 |

* cited by examiner

*Primary Examiner*—Ling-Siu Choi
(74) *Attorney, Agent, or Firm*—Tenley R. Krueger

(57) ABSTRACT

This invention discloses caps and closures for carbonated drinks produced by injection moulding or by compression moulding with a bimodal high density polyethylene (HDPE) resin.

5 Claims, 2 Drawing Sheets

CAPS AND CLOSURES

The present invention relates to caps and closures for carbonated and still drinks prepared with bimodal high density polyethylene resins.

Polyethylene resins prepared with Ziegler-Natta (ZN) catalyst systems are generally used for preparing caps and closures for carbonated drinks. These resins have a reasonably high stress crack resistance, but they leave room for improvement. Such resins are for example Hostalen® GD4755 commercialised by Basell, or Eltex® B4020N commercialised by Inovene.

Metallocene-prepared resins having a narrow monomodal polydispersity index have also been tested in that field but they do not offer ideal mechanical properties because of their limited stress crack resistance.

There is thus a need to prepare resins that can be used to produce caps and closures for carbonated drinks.

It is an aim of the present invention to produce caps and closures for carbonated drinks that have high environmental stress crack resistance.

It is also an aim of the present invention to produce caps and closures for carbonated drinks with a resin that is easy to process by injection moulding or by compression moulding.

It is another aim of the present invention to produce caps and closures for carbonated drinks that have a good rigidity.

It is yet another aim of the present invention to provide caps and closures for carbonated drinks that have good tightness.

It is a further aim of the present invention to prepare caps and closures for carbonated drinks that have a good dimensional stability.

It is yet a further aim of the present invention to prepare caps and closures for carbonated drinks that have a good creep resistance.

It is also an aim of the present invention to produce caps and closures for carbonated drinks that are easy to open.

It is yet a further aim of the present invention to prepare caps and closures for carbonated drinks that have good organoleptical and food contact properties because they have a very little content of volatile organic compounds (VOC).

Accordingly, the present invention discloses caps and closures for carbonated drinks produced by injection moulding or by compression moulding with a bimodal high density polyethylene (HDPE) resin.

The bimodal HDPE resin can be prepared from a physical blend or from a chemical blend. The chemical blend can result for example from a single catalysts system used in a double loop reactor wherein the loops are operated under different polymerisation conditions or from two or more catalyst systems used in a single or in a double loop reactor.

When a double loop reactor is used, it can be operated under various modes:
- hydrogen split wherein different concentrations of hydrogen are used in the different reactors in order to produce a low molecular weight fraction in a reactor and wherein the polydispersity is broadened in the other reactor;
- comonomer split wherein different comonomer concentrations are used in the different reactors in order to produce a low comonomer concentration in a reactor and a high comonomer concentration in the other reactor;
- comonomer/hydrogen split wherein a high molecular weight and high comonomer concentration is produced in one reactor and a low molecular weight, low comonomer concentration is produced in the second reactor. In the direct configuration, the high comonomer concentration is produced in the first reactor and vice versa, in the inverse configuration, the low comonomer concentration is produced in the first reactor.

The first mode, in direct configuration, is preferred in the present invention.

Preferably, the bimodal HDPE resin is prepared with a catalyst system based on a bridged bisindenyl catalyst component. The catalyst component is of general formula I $$R''(Ind)_2MQ_2 \qquad (I)$$

wherein (Ind) is an indenyl or an hydrogenated indenyl, substituted or unsubstituted, R" is a structural bridge between the two indenyls to impart stereorigidity that comprises a $C_1$-$C_4$ alkylene radical, a dialkyl germanium or silicon or siloxane, or a alkyl phosphine or amine radical, which bridge is substituted or unsubstituted; Q is a hydrocarbyl radical having from 1 to 20 carbon atoms or a halogen, and M is a transition metal Group 4 of the Periodic Table or vanadium.

Each indenyl or hydrogenated indenyl compound may be substituted in the same way or differently from one another at one or more positions in the cyclopentadienyl ring or in the cyclohexenyl ring and the bridge.

Each substituent on the indenyl may be independently chosen from those of formula $XR_v$, in which X is chosen from Group 14 of the Periodic Table, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or $CH_3$. More preferably, at least one and most preferably both cyclopentadienyl rings are unsubstituted.

In a particularly preferred embodiment, both indenyls are unsubstituted, and most preferably they are unsubstituted hydrogenated indenyls. Most preferably it is isopropyledenebis(tetrahydroindenyl) zirconium dichloride.

The active catalyst system used for polymerising ethylene comprises the above-described catalyst component and a suitable activating agent having an ionising action.

Suitable activating agents are well known in the art: they include aluminium alkyls aluminoxane or boron-based compounds.

Optionally, the catalyst component can be supported on a support.

This catalyst system is preferably used in a liquid full double loop reactor wherein the loops are operated under different conditions in order to produce a bimodal resin. The double loop reactor can be operated either in direct configuration wherein the high comonomer concentration copolymer is prepared in the first reactor or in inverse configuration wherein the low comonomer concentration homopolymer is prepared in the first reactor.

The bimodal resins of the present invention have densities of from 0.940 to 0.965 g/cm³, preferably of from 0.945 to 0.955 g/cm³ and more preferably of about 0.950 g/cm³. They have a melt index MI2 of from 1 to 50 dg/min, preferably of from 1 to 10 dg/min, more preferably of from 1.5 to 8 dg/min, most preferably from 1.5 to 4 dg/min. They have a polydispersity index that is preferably of at least 3, more preferably from 3.0 to 4.0 and most preferably from 3.1 to 3.6. The molecular weights are determined by GPC-DRI. In solution, long-branched polymers assume a more compact configuration than linear chains and their molecular weight can thus be slightly underestimated. Density is measured following the method of standard test ASTM 1505 at a temperature of 23° C. Melt flow indices MI2 and HLMI are measured following the method of standard test ASTM D 1238 at a temperature of 190° C. and respectively under loads of 2.16 and 21.6 kg. Polydispersity index D is defined as the ratio Mw/Mn of the weight average molecular weight Mw over the number average molecular weight Mn and the molecular weights are determined by gel permeation chromatography (GPC).

The caps and closures of the present invention are prepared by injection moulding or by compression moulding. The injection moulding cycle may be decomposed into three stages: filling, packing-holding, and cooling. During filling, polymer melt is forced into an empty cold cavity; once the cavity is filled, extra material is packed inside the cavity and held under high pressure in order to compensate for density increase during cooling. The cooling stage starts when the cavity gate is sealed by polymer solidification; further temperature decrease and polymer crystallisation takes place during the cooling stage. Typical temperatures for the filling step are of from 160 to 280° C., preferably of from 230 to 260° C. Compression moulding is carried out under similar conditions.

Different approaches have been developed for evaluating resin processability in injection moulding processes.

A first approach for testing flow in runners and in mould cavities during filling is to measure the viscosity at high shear rates and in isothermal conditions. Viscosity at high shear rates is the most important physical property that influences mould filling. The appropriate strain rates depend on the resin, the injection pressure and the mould geometry, but typical strain rates are above 1500-2500 s−1. It is also important to take into account the viscosity differences caused by the temperature differences inside the mould, wherein the central temperature is higher than the peripheral temperature.

A second approach involves non-isothermal tests that simulate the injection moulding process. In these tests, the rheological, crystallisation and thermal properties of polymers are taken into account. The test however does not yield values of physical properties but gives a purely empirical, apparatus-dependent measure of processability. It is the spiral flow test that consists in measuring the spiral flow length before freeze-up of melted polymer injected into a standard mould under standard filling conditions.

The caps and closures according to the present invention are characterised by a remarkably low content of volatile organic compounds.

EXAMPLES

Several resins have been tested in the production of caps and closures for carbonated drinks.

They were selected as follows.

Resin R1 is a monomodal high density polyethylene (HDPE) resin prepared with isopropylidene-bis(tetrahydroindenyl) zirconium dichloride.

Resins R3 to R5 are bimodal HDPE resins prepared with isopropylidene-bis(tetrahydroindenyl) zirconium dichloride (THI) in a double loop reactor in inverse configuration, i.e. wherein the homopolymer is prepared in the first reactor.

Resin R2, R6 and R9 are bimodal HDPE resins prepared with isopropylidene-bis(tetrahydroindenyl) zirconium dichloride (THI) in a double loop reactor in direct configuration, i.e. wherein the copolymer is prepared in the first reactor.

Resins R7 and R8 are conventional, commercially available, Ziegler-Natta HDPE resins.

Their properties are summarised in Table I.

TABLE I

| Resin | Density g/cm³ | MI2 dg/min | Mn kDa | Mw kDa | D |
|---|---|---|---|---|---|
| R1 | 0.949 | 1.9 | 24.3 | 65.3 | 2.7 |
| R2 | 0.950 | 1.5 | 23.3 | 71.2 | 3.1 |
| R3 | 0.950 | 1.9 | 22.8 | 69.2 | 3.0 |
| R4 | 0.949 | 1.2 | 22.8 | 76.7 | 3.4 |
| R5 | 0.949 | 1.5 | 21.8 | 71.8 | 3.3 |
| R6 | 0.948 | 1.5 | 24.0 | 76.8 | 3.2 |
| R7 | 0.952 | 2.1 | 16.5 | 102.2 | 6.3 |
| R8 | 0.952 | 1.9 | 18.0 | 108.4 | 6.0 |
| R9 | 0.950 | 2.0 | 25.4 | 72.9 | 3.6 |

Figure 1:
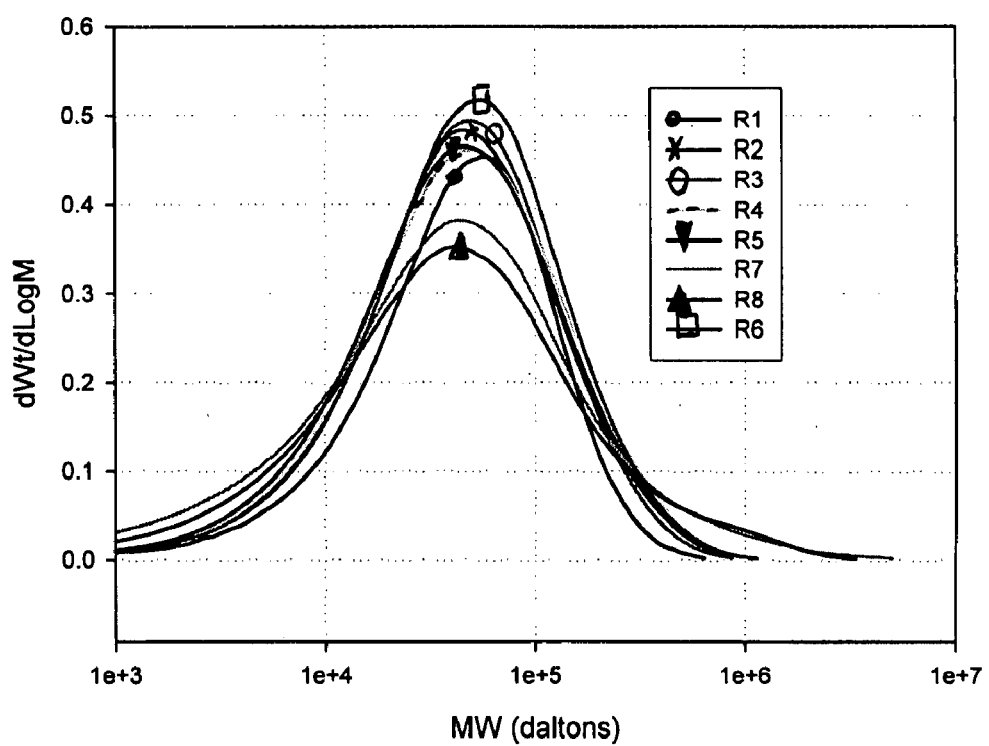
FIG. 1 represents the molecular weight distribution of the resins tested.

The curves representing the molecular weight distribution for all resins are represented in FIG. 1. As expected, the molecular weight distribution of all the resins prepared with a Ziegler-Natta catalyst system are significantly broader than those of all the metallocene-prepared resins. In addition, they include very long chains that are characterised by a high molecular weight fraction above $10^6$ daltons at variance with all the metallocene-prepared resins, both monomodal and bimodal that do not contain very long chains.

The molecular architecture of the resins has also been investigated and the amount of short chain branching and long chain branching has been evaluated for each resin. All samples were very crystalline.

The short chain branching content was measured by NMR. The results for all resins are displayed in Table II as well as the nature of the short branches.

The long chain branching content was determined by the long chain branching index (LCBI) method. The method is described by Schroff R.N. and Mpyridis H. in Macromolecules, 32, 8454 (1999) and LCBI is given by empirical formula $$LCBI = \eta_0^{0.288}/1.88*[\eta] - 1$$

wherein $\eta_o$ is the zero shear viscosity expressed in Pa·s and [q] is the intrinsic viscosity in solution expressed in g/mol. This method is more sensitive than the usual Dow Rheological Index (DRI) or NMR methods and is independent of the polydispersity. It was developed for substantially linear polyethylene such as typically obtained in metallocene catalysis and it only requires the measurement of intrinsic viscosity of a dilute polymer solution and the zero shear viscosity. It is equal to zero for linear chains and deviates from zero when long chain branching is present. The intrinsic viscosity values were calculated from the Mark-Houwink relationship that was developed for linear chains and it must be noted that this method only applies to resins having a small content of long chain branching. The zero shear viscosity was obtained by Carreau-Yasada fitting. The results are displayed in Table II and they show that the resins prepared with Ziegler-Natta catalyst systems have no long chain branching and that the bimodal metallocene-prepared resins have the highest level of long chain branching.

TABLE II

| Resin | Nature SCB | SCB content wt % | LCBI |
|---|---|---|---|
| R1 | butyl | 0.3 | 0.72 |
| R2 | butyl | 0.5 | 1.5 |
| R3 | butyl | 0.8 | 0.89 |
| R4 | butyl | 0.8 | 1.4 |
| R5 | butyl | 0.9 | 1.13 |
| R6 | butyl | 0.7 | 1.29 |
| R7 | ethyl | 0.6 | 0 |
| R8 | — | — | 0 |
| R9 | butyl | 0.7 | 0.7 |

Figure 2:
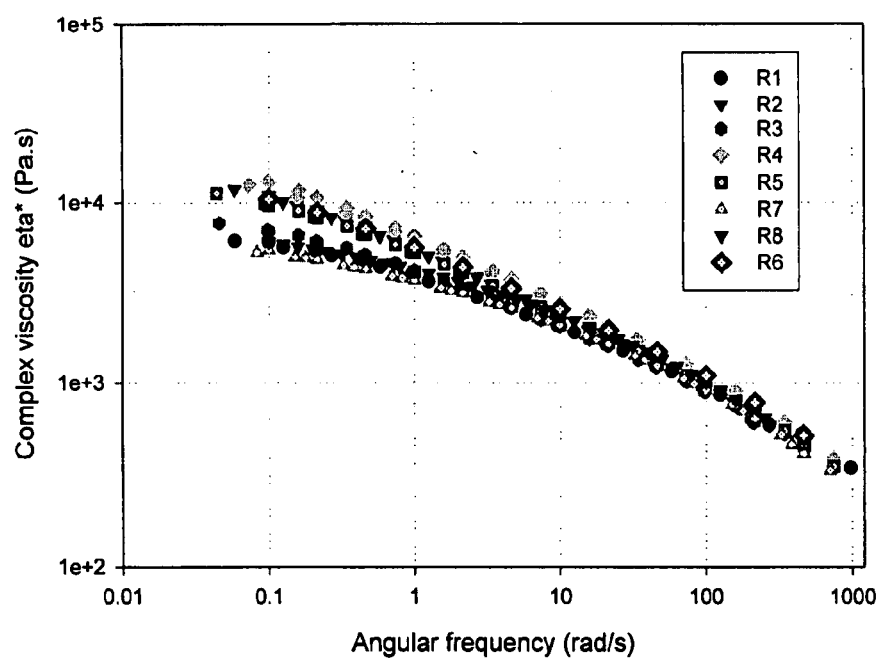
FIG. 2 represents the complex viscosity expressed in Pas as a function of frequency expressed in rad/s for several resins.

The complex viscosity curves as a function of angular frequency are presented in FIG. 2. Plate-plate rheometer data were used because they are more precise and more reliable. It is known in the art that shear thinning or pseudo-plastic behaviour is influenced by the presence of long chain branching or by broadening of the molecular weight distribution. As can be seen from FIG. 2, the bimodal resins prepared with THI have the most pronounced pseudo-plastic behaviour due to the combined effects of the presence of long chain branching and fairly broad molecular weight distribution.

The temperature dependence of the viscosity can be described by formula $$\eta(T) = a_T * \eta(T_0) * (T*\rho/T_0*\rho_0)$$

wherein $a_T$ is the time shift factor, T is the temperature and $\rho$ and $\pi_0$ are the densities respectively at temperatures T and $T_0$. Far from the glass transition temperature, as is the case for the polyethylene of the present invention, the flow activation energy $E_a$ can be derived from the Arrhenius relationship:

$$a_T = \exp(E_a/R*(1/T - 1/T_0))$$

The calculated values are reported in Table III. It was observed that the activation energy of all resins prepared with THI had much higher values of the activation energy than those obtained for the resins prepared with Ziegler-Natta catalyst systems: this is due to the presence of long chain branching.

TABLE III

| Resin | Ea kJ/mole |
|---|---|
| R1 | 44 |
| R2 | 44 |
| R3 | 55 |
| R4 | 35 |
| R5 | 57 |
| R6 | 27 |
| R7 | 27 |
| R8 | — |

A standard moldability test has been carried out. Melted polymer was injected into a standard mould having a simple spiral geometry involving a long flow path. The mouldability index is defined as the flow length, meaning the length of mould filled before freeze-up under standard filling conditions. The injection pressure and temperature have been varied. Flow lengths (FL) for several resins have been reported as a function of increasing injection pressure at a temperature of 210° C. For resin R6, the spiral flow lengths (SFL) have been measured at a temperature of 210° C. and respectively under injection pressures of 500, 800 and 1000 bars: they were respectively of 131, 182 and 231 mm. Bimodal resins present high FL values, in agreement with viscosity results. Bimodal THI resins have a low viscosity at high shear rate as a result of their pronounced shear thinning behaviour.

Several injection trials were carried out to prepare caps and closures with these resins. The injection machine had the following characteristics:

Engel ES250 6340 device, equipped with a barrier screw having a diameter D of 55 mm and a ratio length over diameter L/D of 24;

maximum hydrauloc pressure of 172 bars;

mould having 48 cavities;

caps and closures having a diameter of 28 mm and a weight of 2.8 g

The experimental injection conditions were as follows:

cycle time of about 6 s;

residence time of the material into the screw of about 2 shots, a shot being the average time between two cycles;

screw rotation speed of 400 rpm;

temperature profile: 25/240/245/250/255/260° C.;

holding pressure of 60 bars;

clamping force of 2400 N

The results are summarised in Table IV

TABLE IV

| Resin | $P_{inj}$ bars | Cycle times | Weight g | dem-com | dem-index |
|---|---|---|---|---|---|
| R1 | 157 | 5.9 | 2.8 | rather easy | 2 |
| R2 | 145 | 5.9 | 2.81 | easy | 1 |
| R3 | 145 | 539 | 2.79 | easy | 1 |
| R4 | 153 | 5.9 | 2.8 | easy | 1 |
| R5 | 146 | 6.0 | 2.8 | easy | 1 |
| R6 | 169 | 5.9 | 2.8 | easy | 1 |
| R7 | 137 | 6.0 | 2.8 | easy | 2 |
| R8 | 140 | — | — | — | — |
| R9 | 143 | 6.0 | 2.8 | easy | 1 | wherein Pinj is the maximum injection pressure expressed in bars, dem-com are the demoulding comments and dem-index is the demoulding index ranking from i for easy demoulding to 5 for difficult demoulding. Easy de-moulding of the caps prepared according to the present invention is the result of the excellent dimensional stability of metallocene prepared resins.

In conclusion, the processability of all bimodal mPE was comparable to that of the prior art commercial ZNPE grades. The maximum injection was slightly higher for the bimodal mPE than for the reference conventional ZNPE, but the cycle time was similar to that of prior art resins and demoulding was easy. The maximum injection pressure was in line with viscosity and spiral flow observations.

The characterisation of solid state properties were carried out as follows on two types of specimens:

A) compression-moulded specimens for the evaluation of rigidity by the flexion test following the method of standard test ISO 178.

B) injected caps for the evaluation of:

a) stress crack resistance by specific pressure tests;

b) dimensional stability with a micrometer;

c) tightness by a high pressure test

All caps were prepared in the same injection conditions and on the same machine in order to minimise thermo-mechanical and cap design effects.

Pressure inside carbonated drink bottles can cause excessive deformation of caps and closures. Rigidity is thus a crucial parameter in order to avoid such deformation. The flexural modulus was measured following the method of standard test ISO 178. The results are displayed in Table V. The values of the flexural modulus are very similar for all resins.

Stress cracking in caps and closure occurs in two possible ways: either pressure crack at the top of the cap or capping torque crack at the contouring of the cap.

Pressure tests were carried out using a method developed in-house. It consists in applying a pressure on a cap screwed on a pre-form/bottle.

Five caps were screwed respectively on five bottles at a torque of 1.8 N.m The cap/bottle systems were placed under a constant air relative pressure of 6 bars at a temperature of 45° C. During the test, the pressure was continuously measured and the appearance of macro-cracks was visually checked once a day. The test was stopped when pressure inside the bottles had decreased to atmospheric pressure because of the presence of cracks.

The results are presented in Table V. They show that the superiority of bimodal mPE resins over prior art reference resin R7.

It is known in the art that increasing the molecular weight and short-chain branching (SCB) improves stress crack resistance because there are more tie molecules and more effective tie molecule entanglement and anchoring in the crystalline lamellae. Incorporation of comonomer is also known to increase the content of tie molecules and the efficiency of entanglements. The metallocene-prepared polyethylene resins of the present invention are characterised by long chains, high level of SCB and optimised distribution of SCB along the long chains. As a consequence, they have improved stress crack resistance.

The height and lips of caps were measured about 24 hours after injection with a micrometer. They were all within specifications but the mPE resins presented slightly lower shrinkage than the other resins.

All the caps prepared according to the present invention were also tested for tightness: they were submitted to a pressure of 10 bars during one minute. They all passed the test.

TABLE V

| Resin | $E_{fl}$ MPa | $F50_a$ day | Torque N.m. | VOC ppm |
|---|---|---|---|---|
| R1 | 1085 | 7 | 1.75 | 80 |
| R2 | 1090 | 10 | — | 55 |
| R3 | 1085 | >30 | — | — |
| R4 | 1045 | >30 | — | — |
| R5 | 1065 | >30 | — | 71 |
| R6 | 1000 | >30 | 1.8 | 90 |
| R7 | 1150 | 15 | — | 280 |
| R8 | 1150 | 12 | 1.8 | 130 |
| R9 | 1100 | >28 | — | 100 |

In this table, $E_{fl}$ is the flexural modulus expressed in $Mp_a$, $F50_a$ is the average failure time expressed in days as determined by the in-house method.

In addition opening torque results and taste results have shown equivalent behaviour for all the resins tested.

The volatile organic compounds (VOC) have much smaller concentrations for metallocene-prepared resins than for the Ziegler-Natta resins. Polymer samples were analysed by Automated Thermal Desorption (ATD)/Gas chromatography (GC) method with quantitative analysis by Flame Induction Decay (FID) method. This technique consisted in a thermic desorption, at a temperature of 150° C., of the volatile organic compounds contained in the polymer. The organic compounds were carried along by a stream of helium and were trapped by adsorbent TENAX® cooled down to a temperature of −40° C. The volatile compounds were then injected in a chromatographic separation column by heating the trap to a temperature of 240° C. Quantification was carried out using an external calibration line and identification was carried out on the basis of retention time. The VOC results from Table V show that Ziegler-Natta grades have a much higher concentration of volatile organic compounds than all metallocene-prepared resins according to the present invention.

As a consequence of their low content of volatiles, the organoleptic properties (taste and odour) of the resins according to the present invention were excellent. They were measured by the procedure described as follows. 25 g of pellets were contacted with 1 L of water at a temperature of 60° C. for 48 hr, followed by 48 hr of the same water at a temperature of 20° C. Several dilutions of that water were then tested by a panel of 8 tasters according to the following dilution scheme.

| % test water | Stage |
|---|---|
| 50 | A2 |
| 33 | A3 |
| 20 | A5 |
| 14.3 | A7 |

The test is negative and the sample water is declared not conform if a taste or odour is perceived at stages A5 or A7.

The use of bimodal metallocene-prepared polyethylene resins is thus a very attractive alternative to reference Ziegler-Natta resins. They offer improved stress crack resistance and VOC with respect to reference resins whereas they keep the same level of processability, rigidity, opening torque and taste as prior art resins.

The bimodal HDPE of the present invention can be used in various applications such as for example,
  in injection or compression moulding for caps closure used for beverage, cosmetics or food;
  in blow moulding for milk bottles;
  in extrusion for raffia;
  in cable jacketing.

The invention claimed is:

1. Caps and closures for carbonated drinks comprising bimodal high density polyethylene (HDPE) resin produced with a catalyst system comprising a bisindenyl-based catalyst component, wherein the bisindenyl-based catalyst component is an unsubstituted bistetrahydroindenyl component.

2. The caps and closures of claim 1 wherein the bisindenyl-based catalyst component is isopropylidenebis(tetrahydroindenyl) zirconium dichloride.

3. The caps and closures of claim 1 wherein the HDPE resin is prepared with the bisindenyl-based catalyst system in a double loop reactor in direct or reverse configuration.

4. The caps and closures of claim 1 wherein the bimodal HDPE resin has a density, measured following the method of standard test ASTM 1505 at a temperature of 23° C., of from 0.945 to 0.955 g/cm³, a melt index MI2, measured following the method of standard test ASTM D 1238 at a temperature of 190° C. and under a load of 2.16 kg, of from 1 to 10 dg/min, and a molecular weight distribution, defined by the polydispersity index D that is the ratio Mw/Mn of the weight average molecular weight Mw over the number average molecular weight Mn, of from 3 to 4.

5. A method for preparing the caps and closures of claim 4 by injection moulding or by compression moulding.

* * * * *